UNITED STATES PATENT OFFICE.

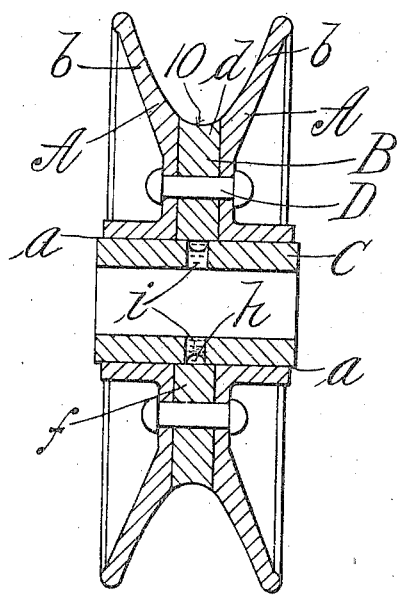
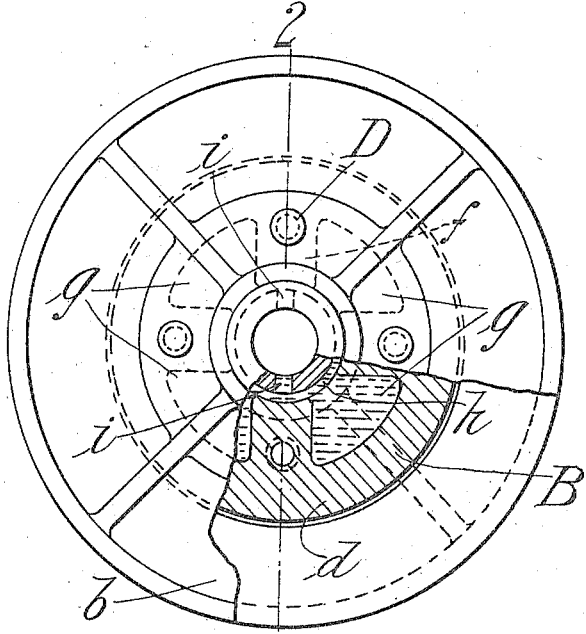
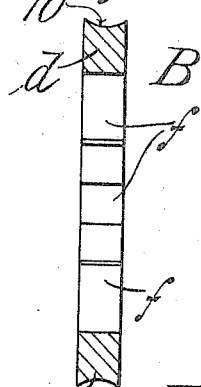
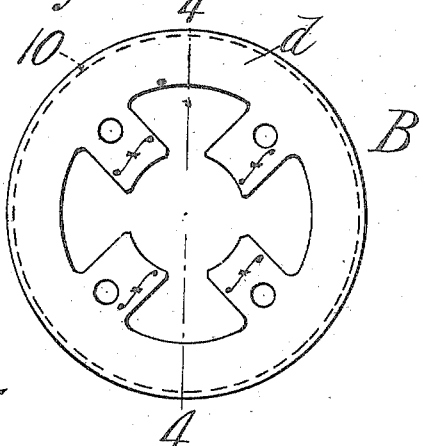
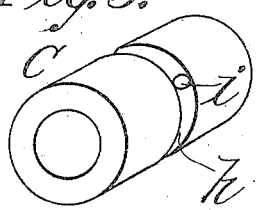

CLESSON W. PUTNAM, OF HOLYOKE, MASSACHUSETTS, ASSIGNOR TO B. F. PERKINS AND SON, INCORPORATED, OF HOLYOKE, MASSACHUSETTS, A CORPORATION OF MASSACHUSETTS.

TROLLEY-WHEEL.

947,758. Specification of Letters Patent. Patented Jan. 25, 1910.

Application filed July 24, 1909. Serial No. 509,327.

*To all whom it may concern:*

Be it known that I, CLESSON W. PUTNAM, a citizen of the United States of America, and resident of Holyoke, in the county of Hampden and State of Massachusetts, have invented certain new and useful Improvements in Trolley-Wheels, of which the following is a full, clear, and exact description.

The object of this invention is to produce a trolley wheel which by reason of the components thereof and the construction of certain of the parts is susceptible of much cheaper production than the ordinary all brass or bronze trolley wheel; and at the same time possesses improved or more efficient capability for the lubrication of the axle on which the wheel is mounted in the harp.

The invention consists in the combinations and arrangement of parts and the construction of certain of the parts all substantially as hereinafter described in conjunction with the accompanying drawings and set forth in the claims.

In the drawings:—Figure 1 is a face view of the improved trolley wheel with a portion thereof represented as in sectional view on a plane midway between the opposite sides of the wheel; Fig. 2 is a sectional view on line 2—2, Fig. 1; Fig. 3 is a face view, and Fig. 4 is a sectional view on line 4—4, Fig. 3, of a frame forming part of the trolley wheel; Fig. 5 is a perspective view of the axle bushing.

In the drawings, the trolley wheel is shown as consisting in its entirety of a pair of oppositely located circular side sections A A, the frame B secured in confinement between said side sections, the bushing C for the axle, and fastening bolts or rivets D.

The side sections A A are preferably made of malleable iron and have alined central circular openings $a\ a$ through their hub portions, and are constructed with edgewise located oblique flanges $b\ b$.

The frame B comprises a circularly continuous outer portion $d$ which is made with a concave edge 10 and with separated inwardly extending members $f\ f$, to form between them, and sidewise walled by the side sections, inwardly opening grease pockets $g\ g$,—four in number in the present instance being provided; and the axle bushing C has a driving fit in and through the centrally apertured side sections, and preferably of a length so that its ends are slightly outside of the opposite faces of the hub portions of the side sections to receive the bearing of the contact springs thereon. The said bushing has an external annular groove $h$ at its middle, the same extending around in a plane between the sides of the said frame; and it has one or more ducts $i\ i$ leading transversely from the groove to the axle hole in the bushing.

The inner ends of the members $f\ f$ of the frame B are substantially in contact with the periphery of the bushing at the grooved portion of the latter. The said frame which constitutes the wear member of the trolley wheel as well as the separated inwardly projecting arms or members thereof create the grease pockets $g\ g$, is advantageously of brass, bronze or like good conducting metal as is also the bushing.

Before the bushing is driven into its place in the wheel the pockets $g\ g$ are filled with a heavy grease or any suitable lubricant and when the wheel is used with the bushing in its place, and mounted on the axle because of the fact that the grease is retained in different pockets separated by radial partitions constituted by the frame members $f$, there is an avoidance from centrifugal action of the grease being thrown around within the wheel; but on the other hand it is retained to pass for the most effectual lubrication of the bearing between the bushing and axle by way of the groove $h$ and ducts $i\ i$ to the bearing.

I claim:—

1. A trolley wheel consisting of a pair of oppositely located circular side sections, having alined central circular openings, and a frame secured in confinement between said side sections, and comprising a circular outer portion and separated inwardly extending members, to form between them, and sidewise walled by the side sections, inwardly opening grease pockets, and an axle bushing having a driving fit in the centrally apertured side sections, and provided with a passage leading transversely from the peripheral portion thereof to the axle opening therein.

2. A trolley wheel consisting of a pair of oppositely located circular iron side sections, having alined central circular openings and edgewise located oblique flanges, and a frame, of brass, bronze or like metal, located between said side sections, and comprising a circularly continuous and concave edged outer portion and separated inwardly extending members, to form opening grease pockets between them, bolts or rivets extending transversely through the thicknesses of, and connecting, the side sections and the said frame, and an axle bushing having a driving fit in the centrally apertured side sections, and provided with a passage extending transversely at the intermediate portion of the bushing to communicate with the axle opening therein.

3. A trolley wheel consisting of a pair of oppositely located circular side sections, having alined central circular openings, and a frame secured in confinement between said side sections, and comprising a circular outer portion and separated inwardly extending members, to form between them, and sidewise walled by the side sections, inwardly opening grease pockets, and an axle bushing having a driving fit in the centrally apertured side sections, with the intermediate external portion of which the inner ends of said frame members have proximate relations, said bushing having an external annular groove in a plane between the sides of the side frame, and having a duct leading transversely from such groove to the axle hole therein.

Signed by me at Springfield, Mass., in presence of two subscribing witnesses.

CLESSON W. PUTNAM.

Witnesses:
   WM. S. BELLOWS,
   G. R. DRISCOLL.